(No Model.)
J. D. SOWERS & J. W. GENTRY.
NUT LOCK.
No. 579,665.  Patented Mar. 30, 1897.
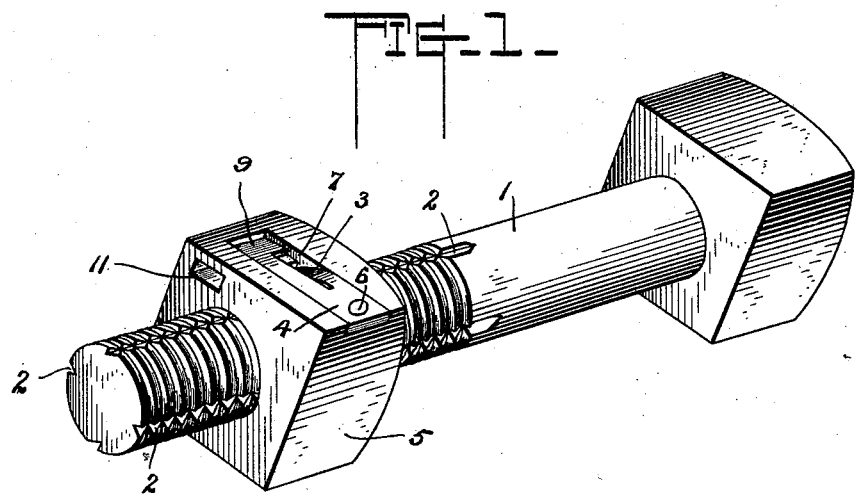
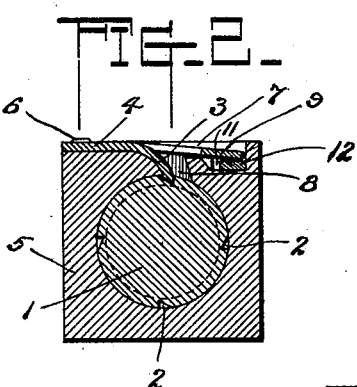
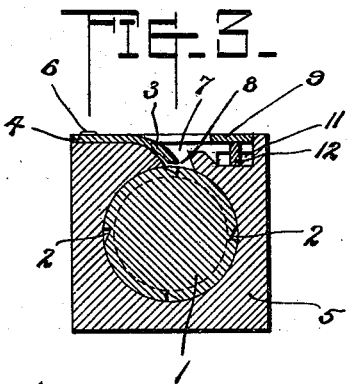
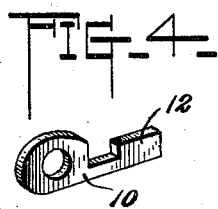
Witnesses
A. M. Poynton
J. J. Riley
Inventors
John D. Sowers and
John W. Gentry
By their Attorneys,
C. A. Snow & Co.

UNITED STATES PATENT OFFICE.

JOHN DANIEL SOWERS AND JOHN WILLIAM GENTRY, OF POCAHONTAS, VIRGINIA.

NUT-LOCK.

SPECIFICATION forming part of Letters Patent No. 579,665, dated March 30, 1897.

Application filed September 17, 1896. Serial No. 606,163. (No model.)

*To all whom it may concern:*

Be it known that we, JOHN DANIEL SOWERS and JOHN WILLIAM GENTRY, citizens of the United States, residing at Pocahontas, in the county of Tazewell and State of Virginia, have invented a new and useful Nut-Lock, of which the following is a specification.

The invention relates to improvements in nut-locks.

The object of the present invention is to improve the construction of nut-locks, and to provide a simple, inexpensive, and efficient one adapted to permit a nut to be readily screwed on a bolt and capable of preventing the same from accidentally unscrewing.

A further object of the invention is to provide a nut-lock which will enable a nut to be readily removed when desired without injuring it.

The invention consists in the construction and novel combination and arrangement of parts hereinafter fully described, illustrated in the accompanying drawings, and pointed out in the claim hereto appended.

In the drawings, Figure 1 is a perspective view of a nut-lock constructed in accordance with this invention. Fig. 2 is a transverse sectional view, the resilient pawl being in engagement with the bolt to lock the nut. Fig. 3 is a similar view, the pawl being held out of engagement with the bolt by the key to release the nut and permit the same to be removed from the bolt. Fig. 4 is a detail perspective view of the key.

Like numerals of reference designate corresponding parts in all the figures of the drawings.

1 designates a bolt provided at its threaded portion with longitudinal grooves 2, adapted to be engaged by a resilient pawl 3 of a spring-plate 4, which is mounted on a nut 5. The spring 4, which is constructed of flat metal, is secured at one end by a pin 6 or other suitable fastening device in a recess 7 of one of the side faces of the nut 5, and it is longitudinally cut at a point intermediate at its ends to provide the pawl 3.

The pawl 3 is curved inward and extends into an opening 8 and is adapted to engage the bolt. The bolt is preferably provided with four grooves, so that the nut may be locked at each quarter-turn, and the grooves 2 are shouldered at one side and beveled at the other to permit the nut to be screwed forward and to lock the same against retrograde rotation. When the nut is screwed forward, the end of the pawl rides over the inclined or beveled sides of the grooves; but when the nut is moved backward the pawl engages the shouldered side of the adjacent groove and locks the nut.

When it is desired to disengage the pawl from the bolt to permit the nut to be unscrewed, the free end 9 of the spring is engaged by a key 10, which is inserted beneath the free end of the spring. The nut is provided with a keyhole or opening 11, arranged at right angles to the recess 7 and extending inward from the outer face of the nut at the free end of the spring. The key has a shank provided with a lug 12, which, after it has been introduced into the recess in the position illustrated in Fig. 2 of the accompanying drawings, is adapted to be turned at right angles, as illustrated in Fig. 3 of the accompanying drawings, to force the free end of the spring outward and disengage the pawl from the bolt. The shank of the key is provided with square edges in order that it may be held by the spring in the position shown in Fig. 3, so that the nut may be readily removed without keeping the hand on the key.

It will be seen that the nut is simple, strong, and durable, that it is capable of securely holding a nut against the retrograde rotation, and that the pawl may be readily disengaged from the bolt by a key when it is desired to remove the nut. It will also be apparent that one key may be used to unlock a large number of nuts and that as the recess of the nut is located between the inner and outer faces of the same, and as the spring is entirely housed within the same it will be difficult to unlock the nut without a key.

What we claim is—

In a nut-lock, the combination of a bolt provided with longitudinal grooves, a nut provided at one of its faces with a recess and having a keyhole extending inward from its outer face and communicating with the said recess, said nut being provided at a point intermediate of the ends of the recess with an opening communicating with its bolt-opening, a flat spring secured at one end to the nut in the recess thereof and having its free end arranged adjacent to said keyhole and adapted to be engaged by a removable key, said spring being provided with an integral tongue formed by splitting it longitudinally and arranged to engage the grooves of the bolt, substantially as described.

In testimony that we claim the foregoing as our own we have hereto affixed our signatures in the presence of two witnesses.

JOHN DANIEL SOWERS.
JOHN WILLIAM GENTRY.

Witnesses:
J. H. CRAFT,
JOSEPH L. DEATON.